W. L. GUMPRECHT.
COMBINED TYPE WRITING AND COMPUTING MACHINE.
APPLICATION FILED NOV. 11, 1914.

1,305,537.

Patented June 3, 1919.
9 SHEETS—SHEET 1.

INVENTOR:
William L. Gumprecht
BY B. C. Stickney
ATTORNEY.

WITNESSES:
H. O. Westphal
F. E. Alexander

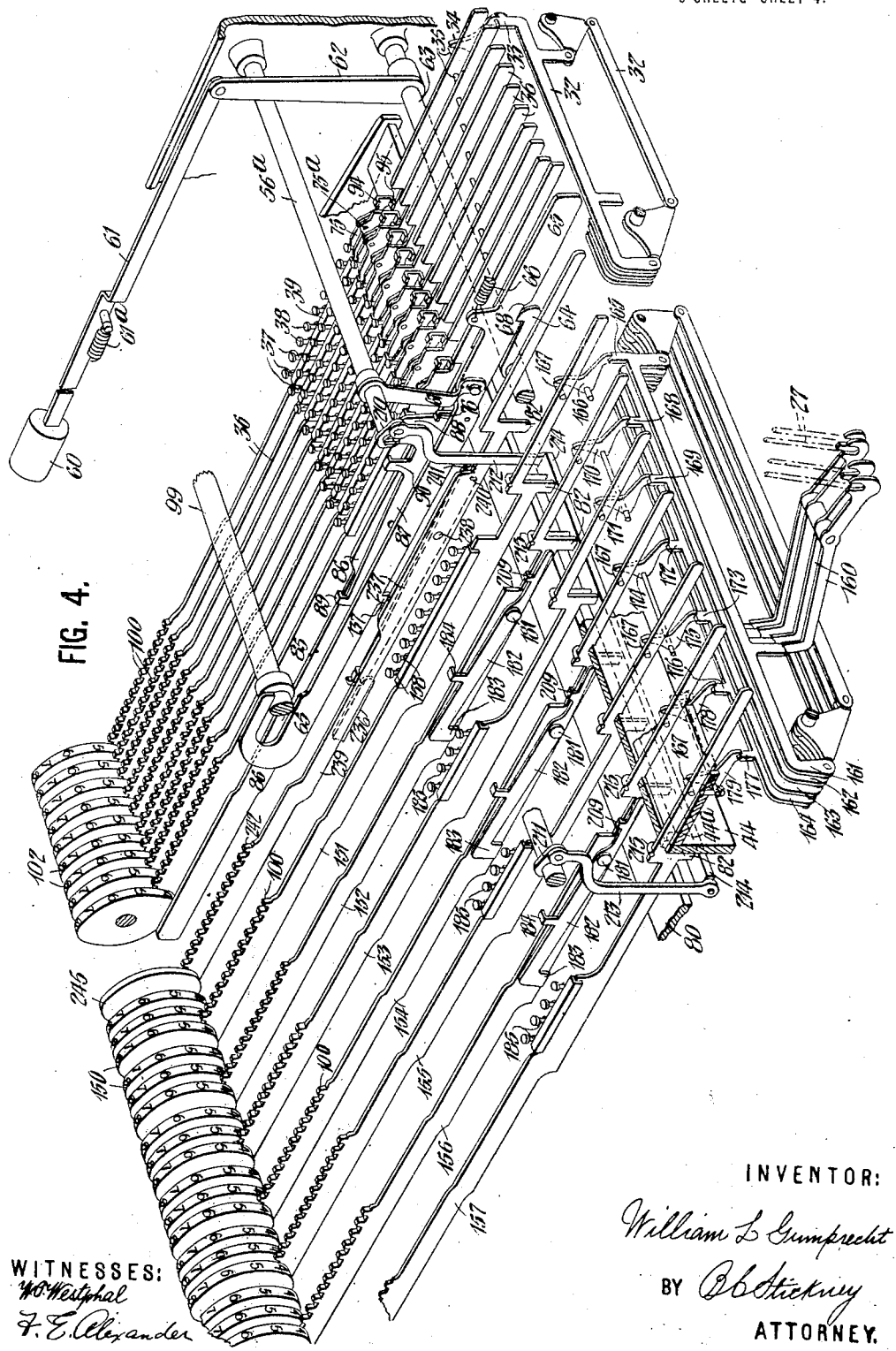

W. L. GUMPRECHT.
COMBINED TYPE WRITING AND COMPUTING MACHINE.
APPLICATION FILED NOV. 11, 1914.
1,305,537.
Patented June 3, 1919.
9 SHEETS—SHEET 5.
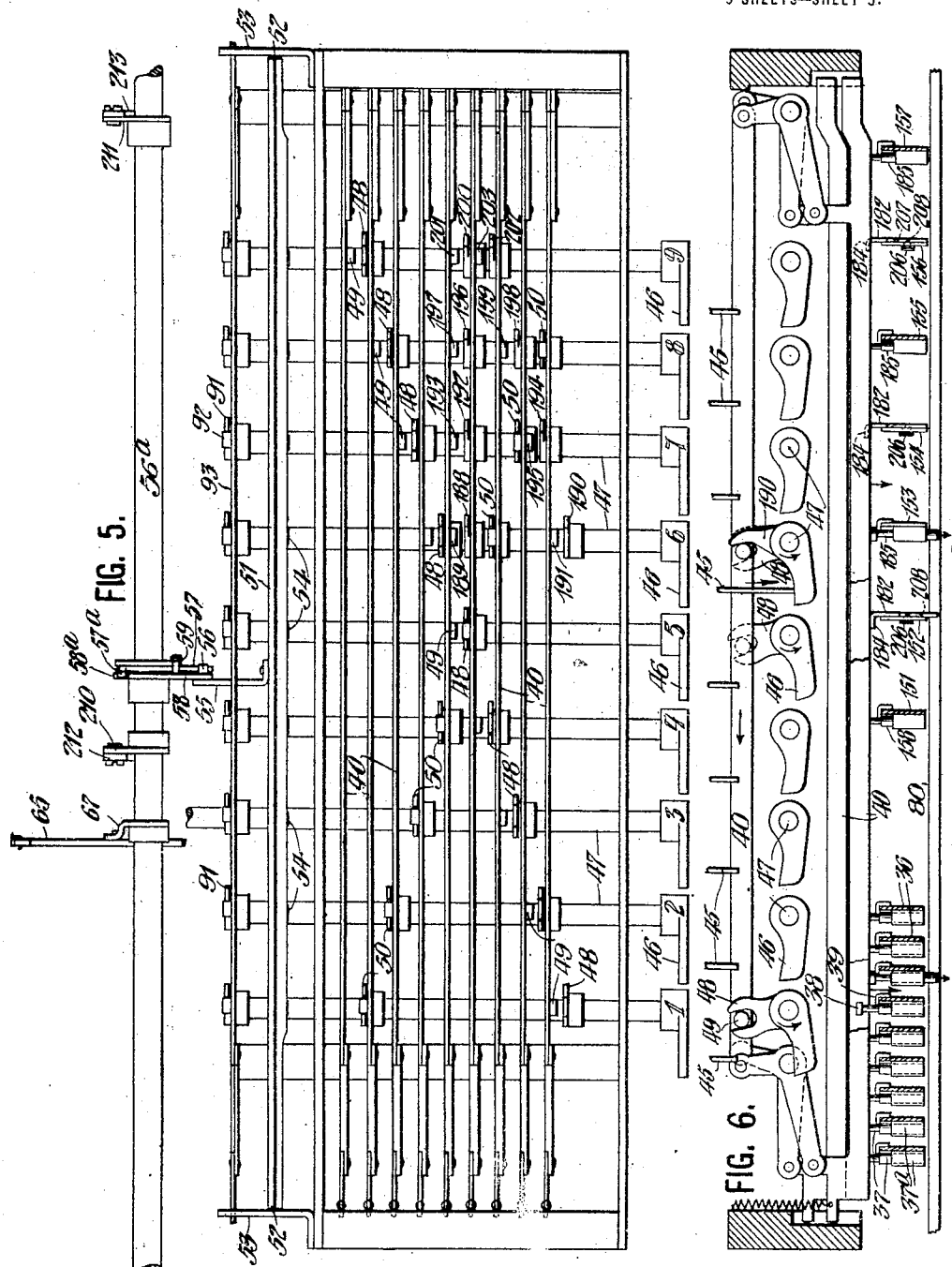
WITNESSES:
INVENTOR:
William L Gumprecht
BY
ATTORNEY.

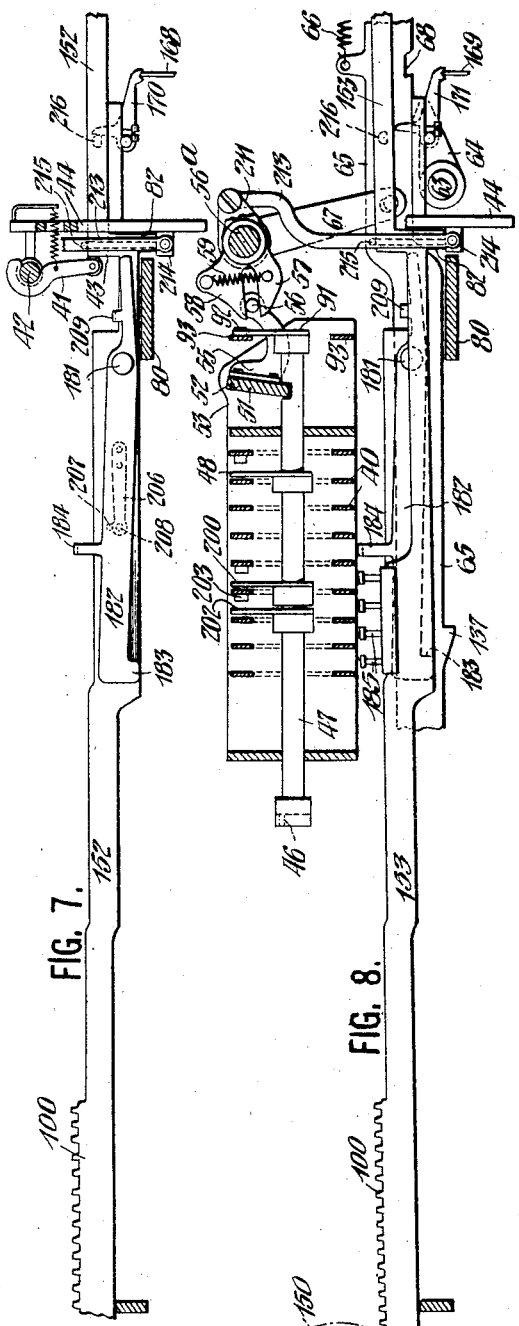

W. L. GUMPRECHT.
COMBINED TYPE WRITING AND COMPUTING MACHINE.
APPLICATION FILED NOV. 11, 1914.

1,305,537.

Patented June 3, 1919.
9 SHEETS—SHEET 7.

WITNESSES:

INVENTOR:
William L. Gumprecht
BY
ATTORNEY.

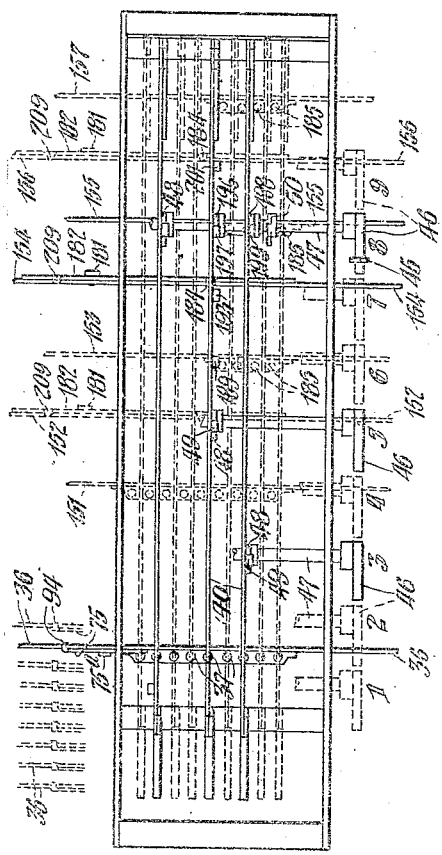
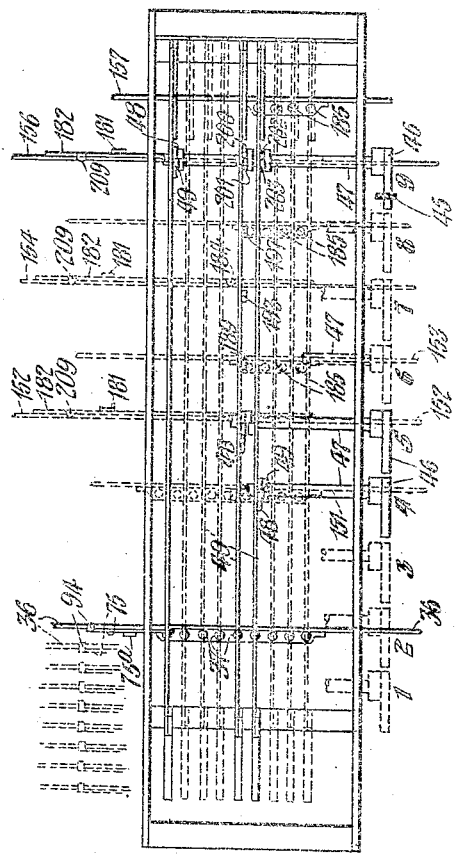

W. L. GUMPRECHT.
COMBINED TYPE WRITING AND COMPUTING MACHINE.
APPLICATION FILED NOV. 11, 1914.
1,305,537.
Patented June 3, 1919.
9 SHEETS—SHEET 9.
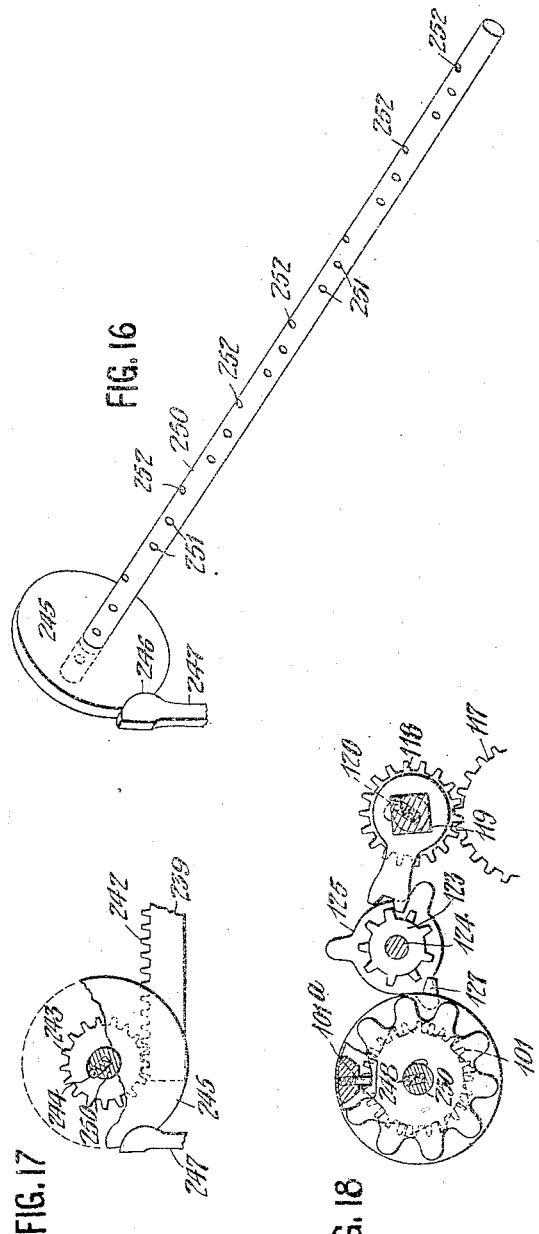
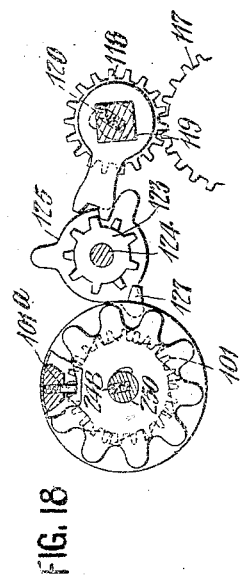
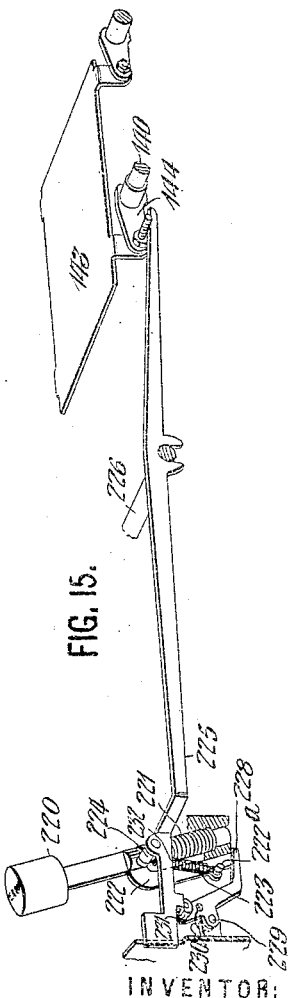
WITNESSES:
H. P. Westphal
F. E. Alexander
INVENTOR:
William L. Gumprecht
BY B. L. Stickney
ATTORNEY.

UNITED STATES PATENT OFFICE.

WILLIAM L. GUMPRECHT, OF HARTFORD, CONNECTICUT, ASSIGNOR, BY MESNE ASSIGNMENTS, TO UNDERWOOD COMPUTING MACHINE COMPANY, OF NEW YORK, N. Y., A CORPORATION OF NEW YORK.

COMBINED TYPE-WRITING AND COMPUTING MACHINE.

1,305,537.   Specification of Letters Patent.   Patented June 3, 1919.

Application filed November 11, 1914. Serial No. 871,458.

*To all whom it may concern:*

Be it known that I, WILLIAM L. GUMPRECHT, a subject of the King of Great Britain, residing in Hartford, in the county of Hartford and State of Connecticut, have invented certain new and useful Improvements in Combined Type-Writing and Computing Machines, of which the following is a specification.

The present invention relates to mechanism for computing the number of measures or pieces of selected values or denominations which aggregate an amount expressed in terms of its total number of units. For example, in selecting currency with which to make a payment, it is desirable to handle as few pieces as possible, and therefore it is of advantage to know in advance how many pieces of the largest convenient denomination, such as ten dollar bills, can be used, and how many pieces, each, of certain other denominations, such as five and one dollar bills, and smaller silver, are required in addition thereto. The invention is adaptable to use, not only in dealing with amounts of currency of any character, but also dealing with any amounts capable of being measured and expressed in terms of units or multiples of selected denominations.

The invention is hereinafter illustrated in connection with a combined Underwood-Hanson typewriting and computing machine. It will be understood, however, that this is merely one adaptation of the invention, and that it may be advantageously used in connection with other computing machines, or as a machine in itself.

In registering amounts it has heretofore been characteristic of computing machines that the amount is registered in the same terms as those in which it is expressed upon the machine; that is to say, $8, for instance, would be registered as $8. By means of the present invention, however, $8 may be registered as one "five dollar" piece plus three "one dollar" pieces, or in terms of other denominations. The invention therefore involves a mechanism for receiving a plurality of expressions which conjointly represent an amount registered thereon.

The mechanism as hereinafter shown, may conveniently comprise a system of bars, representing selected measures of different denominations, two or more of which may be set by any numeral key to register on the bars the number of units, each, of the selected denominations which make up the amount on the numeral key. When the invention is combined with a typewriter, and the amount to be written has figures in several column positions, the movement of the carriage may be used in a well known way to select the bars on which the settings are to be made; two or more bars being selected for each column position of the carriage, where the number written in that column is to be expressed in terms of more than one denomination.

In order that the number of units or multiples of like denomination obtained from amounts successively written or expressed, may be indicated, each bar or equivalent device may control a separate accumulator or counter of construction quite similar to that of the accumulators ordinarily used in obtaining the sums of typewritten amounts in combined typewriting and computing machines.

The above and other features of the invention will more fully appear upon reference to the accompanying drawings, in which, Figure 1 is a view in sectional side elevation, taken at the line 1—1 of Fig. 2, of an Underwood-Hanson combined typewriting and computing machine to which the present improvements are applied, the parts being shown in normal position.

Fig. 4 is a perspective view from the rear showing the pin bars and certain of the operating and setting connections for the same.

Fig. 5 is a top plan view of the pin-setting linkages and connections for operating the same from the numeral keys, and for shifting the same between the addition and subtraction position.

Fig. 6 is a view in side elevation of the linkages and key connections shown in Fig. 5, the pins and pin bars being also shown below the linkages.

Fig. 7 shows in side elevation, and in normal setting, one of three similar bars which control the accumulators of the $5.00, 50 cent and 5 cent denominations respectively, together with certain parts for actuating the same.

Fig. 8 shows in side elevation, set for subtraction, one of three similar bars and operating connections which control the accumulators of the $1.00, ten cent and one cent denominations respectively, part of the Fig. 6 bar, and of the subtraction bar, being shown behind the same, and the operating linkages and connections of Fig. 5 being shown in cross section above the same.

Fig. 9 is a view in side elevation of the bars shown in Fig. 8, the position of the parts being that assumed when the general operator bar has been advanced to engagement with the subtraction bar.

Figs. 11, 12 and 13 are views similar to that of Fig. 10, except that the parts shown in full lines are those actuated upon depression of the "7", "8", and "9" keys respectively, in the adding operation.

Fig. 14 is a view in side elevation of a part of the subtraction bar and one of the pin bars, showing also the bail for setting the "9" pins for subtraction, and certain dogs and levers for setting, holding and shifting the parts.

Fig. 15 is a perspective view of the error key and its connections, for erasing at will settings on the register.

Fig. 16 is a perspective view of the shaft on which the dials are mounted, and the means for holding the shaft in true position.

Fig. 17 is a view in side elevation showing the driving connections of the zero bar to the shaft shown in Fig. 16.

Fig. 18 is a view in side elevation showing certain details of the dial shaft and tens-carrying mechanism.

Figure 1:
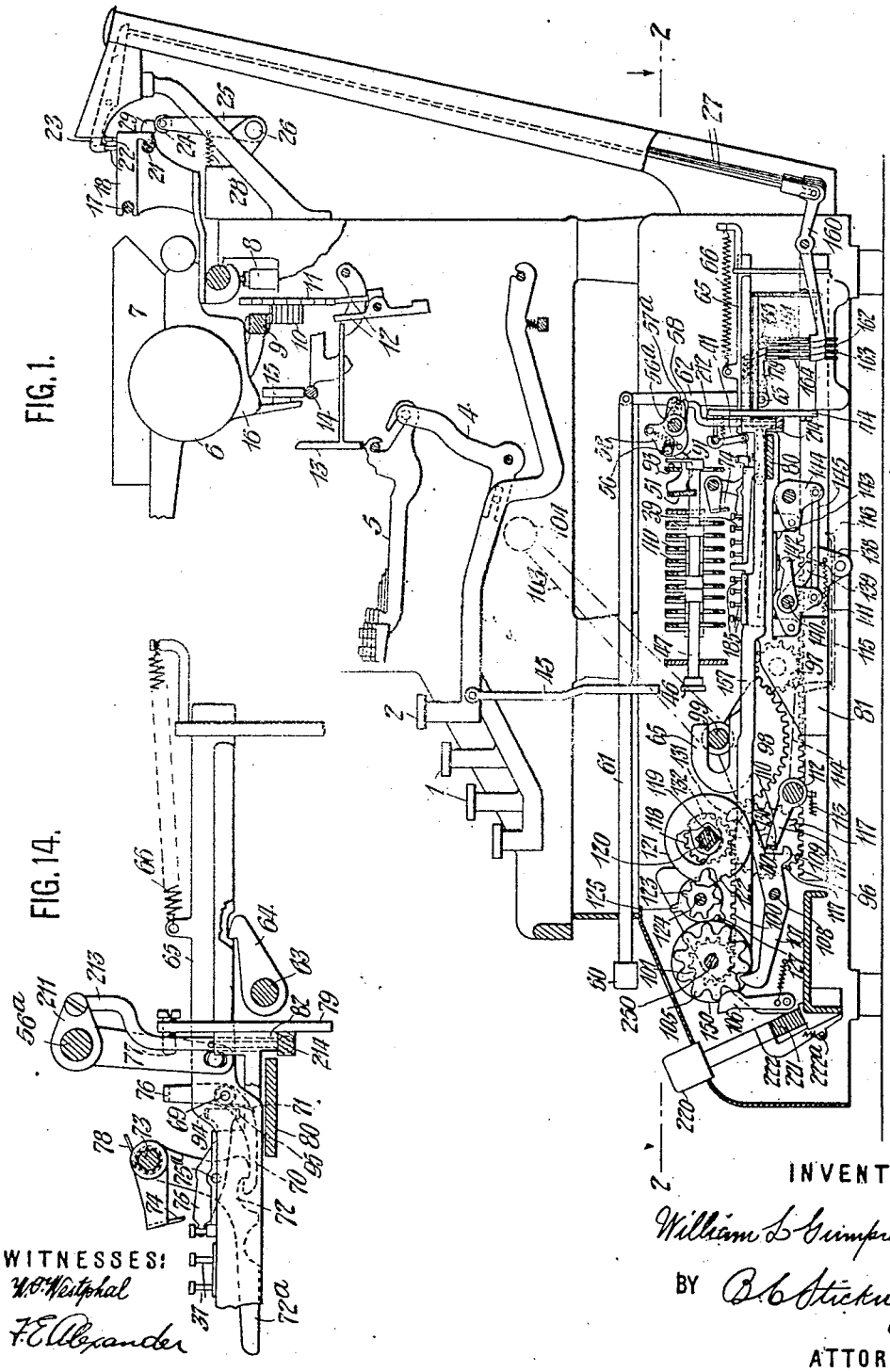

In the Underwood combined typewriting and computing machine illustrated in the drawings, alphabet keys 1 and numeral keys 2 operate to depress levers 3 to actuate bell cranks 4 and thus swing type-bars 5 upwardly and rearwardly against platen 6, which is mounted on carriage 7, driven by the usual spring barrel 8, Fig. 1. A rack 9 on the carriage meshes with a pinion 10 connected to an escapement wheel 11, which coöperates with carriage feeding dogs 12. The latter are connected to a universal bar 13 operated by the type-bars 5. The platen may be moved in the usual way between case positions by means of a shiftable rail 14 which supports roller 15 carried by the platen frame 16.

Pivotally supported and shiftable to desired computing zone positions along a rail 17 on the carriage are two tappets 18 and 19. A tooth on each tappet by engagement with notches at letter-space distance apart on a rail 21, holds the tappets in their selected positions. Each tappet has a dog 22, which when a tappet is set, engages and cams up successively each of a number of jacks 23 also set at letter-space distance apart. Except when the machine is to be used for computing purposes, the tappets are below and out of reach of the jacks. When however, the rollers 24, which serve as cams to lift the tappets and maintain the same in raised position, are swung up by the supporting arms 25 on shaft 26 (see Fig. 3), the dogs 22 are brought into the line with the jacks; and, as the carriage advances, actuate the jacks to depress rods 27. Springs 28 hold the rolls 24 in effective position, and tapered rolls 29 on the tappets insure proper and easy coöperation and movement of the tappets and rolls 24. The dogs 22 have free movement in one direction to permit the jacks to pass the same on the return movement of the carriage, and are returned by springs to normal position when released by the jacks on the carriage return movement. The rolls 24 are of sufficient length to hold the tappets in effective position through the computing zone.

The jacks 23 and rods 27 (see Fig. 3) are shown as in two sets or series, in each of which their action is similar. The jacks controlled by the tappet 18 are in number equal to the number of decimal columns in the amounts to be written, and are usually nine. The particular machine shown in the drawings, however, is not designed to register or compute in its denominational or coin-indicator or counter section the coins, etc., of items over 99, 99; and when therefore its denominational section is employed, only four of the jacks controlled by the tappet 18 are of any use. The mechanism set by tappet 18 is that used in the usual adding and subtracting of amounts written, and is for the most part already old in the Underwood combined typewriting and computing machine. The mechanism set by the tappet 19 concerns the denominational accumulators, new in the present invention, and will be hereinafter described in detail.

Each of the rods 27 when depressed by the tappet 18 rocks one of a series of levers 30 having teeth 31, each to engage and lift one of a series of linkages 32. Each of the linkages 32 has a lug 33 to engage and rock a bell crank 34, and each bell crank 34 when rocked, sets a computing pin rack bar 36 for the column represented by the particular jack actuated, the setting being effected by a slight forward movement of the bar due to the engagement of the bell crank 34 with a projection 35 on the bar. The bars 36 at their front ends are provided with racks 100 engaging pinions 101 which have pawl and ratchet connections to dials or computing wheels 102 having numbers from "0" to "9" on their peripheries arranged to be exhibited through a sight opening in the casing of the computing mechanism. The linkages 32 invert the order of the jacks and bars, the jacks being successively operated from right to left, and the corresponding dials being arranged from left to right for proper representation of the amounts.

Computing pins or devices 37, nine in number, one for each of the nine digits, are carried by each bar 36 in sockets 37ᵃ, (see Fig. 6) in which they have a normally elevated position, but in which they may be depressed so as to protrude below the bar in a position determined by the head 38 of the pin striking a plate 39 on the bar. These pins 37 are arranged in order on the bars with the "1" pin in front and the "9" pin to the rear; and the selected pin in any column is set by causing the same to be depressed after the pin bar for that column has itself been set by the forward movement just described. The depression or setting of the pins is effected by means of a series of depressible linkages 40, nine in number, arranged pin distance apart at right angles above the pin bars, and which, as shown in Figs. 1 and 8, are normally out of alinement with cross rows of pins, and can therefore only set pins in the particular bar 36 which has been set forward by its jack to bring its pins directly under the linkages. As shown in Fig. 6, each linkage is comprised of an upper and a lower reach connected by bell crank levers, and is normally collapsed so that the lower or pin-striking reach is above the plane of the pin heads. The pin bars are held in normal unset position against a plate 44 by means of spring-controlled fingers 41, pivoted at 42 to the frame and bearing against shoulders 43 on the pin bars.

The linkages 40 are operated from the keys 2, and are arranged from front to rear so that in the adding operation the "1" key will operate the front linkage, the "2" key the next linkage, and so forth; the "9" key operating the rearmost linkage. The keys have depending thrust arms 45 which, when the keys are depressed, engage and rock arms 46 fast to shafts 47. There is a shaft 47 for each key, and only one certain shaft is rocked by the same key whether the operation be for addition or subtraction. The shafts 47 are arranged at right angles to the linkages 40, below the same, and each has also fast thereto a bifurcated arm 48, which when the parts are set for adding, engages a wrist pin 49 on that linkage 40 whose position in the order of linkages from front to rear, corresponds to the key depressed. As the shaft 47 is rocked, on depression of the key, the lower reach of the linkage engaged by it, depresses or sets the pin which has been brought under it, and when the key is released, a suitable spring returns the linkage and rock shaft and key to normal position. No linkage 40 or pin 37 is required for the cipher key because no amount is to be accumulated for that key.

In the machine shown in the drawings, subtraction is effected by the "complementary" method. The dial wheels of the accumulators, each of which, in a full revolution, successively presents to view the nine digits and the cipher, always turn in adding direction only. Consequently in registering a subtraction, the amount written cannot as such be transferred to the dials. The transfer is however in effect made by adding, to the amount already recorded by the dials, an amount, each column figure of which is the complement of the figure in the corresponding column of the amount to be subtracted, with "nine" as the base or complete number instead of "ten." In this operation the cipher may be considered as complementary to the number nine, and to obtain the correct result one unit must be added to the complementary number recorded in the units or cents column. Thus assuming that the register shows "00,000,100" and it be desired to subtract "50" therefrom, the operation will proceed as follows:— Pins must be set up representing "99,999,949." These digits are carried into their respective computing wheels, making them read "99,999,049." An additional unit is also added to the units or left-hand wheel and the carryover then operated, thus making the wheels read "00,000,050,"—the "1" of the "100" previously in the register of course causing a carryover onto the thousands wheel.

In effecting a subtraction, it is therefore necessary, before the amount to be subtracted is written, to change the key connections to the linkages 40 so that any key operated will set the pin which represents the number complementary to that on the key. It is also necessary first to set all of the "9" pins so that if no digit key is operated in any particular column, the computing wheel corresponding to that column will nevertheless have a nine point revolution. Having set all the "9" pins to meet the contingency of a cipher, or "no number", in one or more of the columns, it becomes necessary to unset the "9" pin for every column in which any digit is written. The means for accomplishing these various purposes are not new in the present invention; but since the denominational computing mechanism is here illustrated as inter-related to the coin counting mechanism which adds written amounts, and is disconnected from the latter mechanism during subtracting operations, a comparatively full description of the entire computing mechanism will assist in a clear understanding of the invention.

Referring to Fig. 5, it will be noted that the rock shafts 47, except the "5" and "9" shafts, in addition to the arms 48 for engaging those linkages 40 which correspond in position to the number of the key which operates the shaft, also have other bifurcated arms 50 for engagement with wrist pins on the complementary linkages. On the "5" shaft the arm 48 can be used to serve the purpose of an arm 50; and, as the complement of nine is in effect zero, the "9" shaft needs no complementary connection. In Fig. 5, the setting shown is for subtraction. The shift between adding and subtracting positions is effected by means of a shaft bar 51 pivoted at 52 to the frame 53 and engaging alined notches 54 in each of the rock shafts 47, so that when bar 51 is swung, all the shafts 47 are moved together longitudinally in their bearings in the frame. For swinging the bar 51, there is attached to it an arm 55 having a pin 56 at its outer end engaged between an arm 57 fixed on shaft 56$^a$ and an arm 58 loose on this shaft, these arms being yieldingly connected by a spring 59, and being limited in their movement toward each other by a pin 57$^a$ on the arm 57 and a toe 58$^a$ on the arm 58. Normally arms 57 and 58 will move together with shaft 56$^a$ to throw the shifter, but in the event of a jam, to prevent injury, the arm 58 may remain behind while the spring 59 stretches. The shaft 56$^a$ is rocked from the subtraction key 60 (see Fig. 4), when the latter is pressed, by means of a push bar 61 connected to an arm 62 fast to a shaft 63, to which is also fast a dog 64 for holding the subtraction bar 65 normally forward against the actions of a spring 66. The subtraction bar has a pin-and-slot engagement with an arm 67 fast to the shaft 56$^a$, so that when dog 64 is removed from its notch 68 in the subtraction bar, the spring 66 by throwing the subtraction bar, rocks shaft 56$^a$ and causes the linkage connections to be shifted to the position shown in Fig. 5, in which the complementary linkages are shown in operative connection with the keys.

The setting of the "9" pins is effected when the subtraction bar is moved by the spring 66; and, to this end, (see Fig. 14) there is pivoted at 69 to the subtraction bar a trip 70 normally held by spring 71 in the position shown in Fig. 14, so that on movement rearward with the subtraction bar, it engages and trips an arm 72 fast on a shaft 73 to which a bail 74 is also fast. The bail 74 is thereby caused to strike simultaneously all of a series of pin-setting and unsetting levers 75, each pivoted at 75$^a$ to one of the pin bars, and each of which is engaged between the head and a shoulder on the "9" pin on the bar to which it is pivoted, thereby depressing and setting these pins. When spring 66 has moved the subtraction bar a sufficient distance, the head 76 of the trip 70 strikes a set screw 77, on a stationary plate 79, which causes the trip to be rocked out of engagement with the bail arm 72, whereupon a coil spring 78 returns the latter to normal position, leaving all of the "9" pins set. When presently the general operator which includes bar 80 is moved forward, and picks up the subtraction bar to return it to normal position, the spring 71 returns the trip to the position from which it was forced by the stop 77. A toe 72$^a$ on lever 72, if the latter has not been returned by spring 78, will be struck by bar 80 to force lever 72 to Fig. 14 position.

At the time the "9" pins are set connections become effective to provide also for an extra step movement of the units or cents pin-bearing rack bar and its computing wheel. The extent of movement of the rack bars to rotate the associated computing wheels depends upon the particular pins set up thereon, as stated above. These pins are engaged by the cross bar 80 on the general operator 81, which is reciprocated in a manner to be described, so that on its forward motion it engages the set pins to force or drive the pin-bearing rack bars forward an amount corresponding to the particular pins set up, and so that on its rearward motion it will return the rack bars by engagement with fixed lugs 82, one of which is provided on each of the rack bars.

Figure 2:
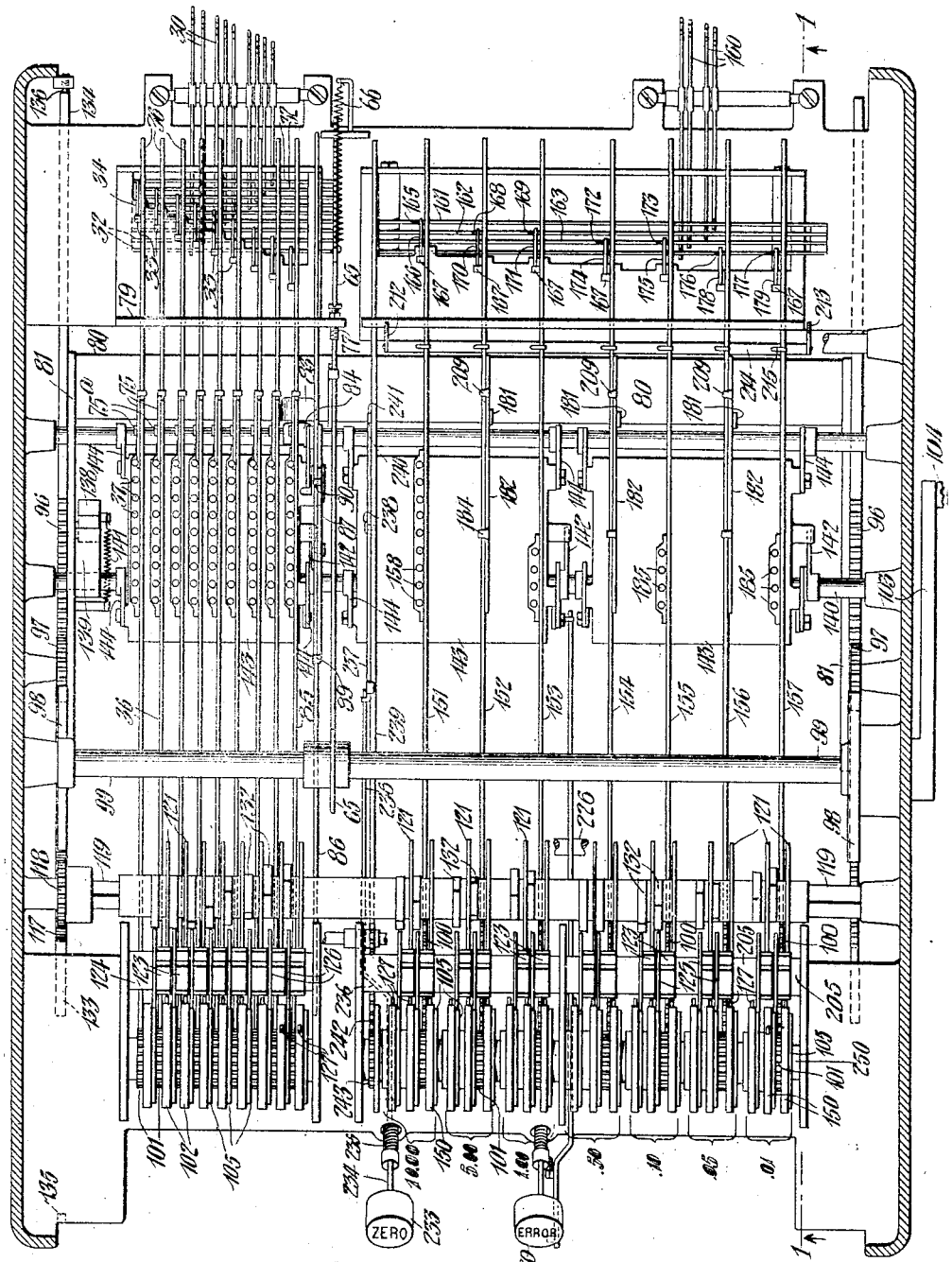
Fig. 2 is a plan view of the computing mechanism taken on the line 2—2 of Fig. 1.

As will be seen by reference to Fig. 2, the cross bar 80 of the general operator has a uniform front edge except for that portion which comes into engagement with the set pins on the units or cents bar indicated specifically at 83. That is to say, the general operator cross bar 80 has a piece 84 cut out of the front edge thereof, which piece can at times enter its socket 83, as in a normal adding operation, so that the units or cents pin-bearing rack bar will be given a movement corresponding to the particular pin set up thereon, with the result that identical pins set up on all bars will cause the general operator to drive their bars identically or, in other words, the front edge of the cut-out portion 84 will come into alinement with the front edge of the body portion of the general operator cross bar 80.

For a subtracting operation, however, this cutout portion 84 is located forward with its front edge one step in advance of the front edge of the general operator cross bar 80, so that it will come into contact with whatever pin happens to be set on the units or cents bar 85 one step prior to the engagement with the front edge with the corresponding pin on any of the other pin-bearing rack bars. To maintain this forward placement of the cut-out portion 84, there is provided a supernumerary bar 86 corresponding to the other pin-bearing rack bars 36, with the exception that it is unprovided with a rack, in that it does not rotate any computing wheel directly, and is unprovided with pins. This supernumerary bar 86, however, carries the cut-out portion 84, so that it will reciprocate with the general operator cross bar 80.

In the normal adding operation, the cut-out portion 84 will be overtaken by the general operator cross bar 80 before the front edge of the latter comes into engagement with any of the set pins on the pin-bearing rack bars, at which time the front edge of the cut-out portion 84 will be located in alinement with the front edge of the cross bar 80, so that all the pin-bearing rack bars will be given movements corresponding exactly to the pins set up thereon. At the end of the forward stroke of the general operator cross bar 80, a lug (not shown), on the supernumerary bar 86, corresponding to the lugs 82 on the pin-bearing bars, will be located one step to the rear of the latter, so that on the return movement of the latter, the supernumerary bar 86 and the portion 84 carried thereby will lag behind the cross bar 80 one step, until the latter overtakes it, whereby when the general operator cross bar 80 comes to its home position, the front edge of the cut-out portion 84 will be located one step in advance of the front edge of the cross bar 80.

As stated above, in the subtracting operation it is necessary to maintain the cut-out portion 84 in its advanced position with respect to the general operator cross bar 80. For this purpose, when the "9" pins are set by the bail 74, a trigger 87 pivotally mounted on the supernumerary bar 86 is forced down from a raised position out of the path of the general operator cross bar 80, to a depressed position with a shoulder thereon in the path of the front edge of the general operator cross bar 80, by the engagement of the "9" pin setting bail 74 with an upwardly-extending finger 88 on the trigger 87. The up and down movements of the trigger 87 are limited, respectively, by lugs 89 and 90, which overhang the top edge of the supernumerary bar 86 at the opposite sides of the pivot of the trigger 87.

It will thus be seen that when the "9" pins are set up for subtracting operation, the trigger 87 will at the same time be depressed to bring a shoulder thereon into the path of the general operator cross bar 80, so that the front edge of the cut-out portion 84 carried by supernumerary bar 86, will be maintained one step in advance of the front edge of the general operator cross bar 80, whereby it will come into engagement with the particular pin which happens to be set up on the units or cents bar 85 one step in advance of the corresponding engagement of the front edge with a corresponding pin set up on any of the other pin-bearing rack bars 36. This, then, gives to the units or cents wheel a rotation one step in excess of that which it would receive to correspond with the particular pin set up on its associated rack bar. For example, if zero were subtracted in the cents or units column, then the "9" pin would remain set up and the units or cents wheel would receive a rotation not only of nine steps but one step in excess thereof, so that it would be revolved ten steps or a complete revolution in this decimal system, whereby "1" would be carried to the next higher computing wheel.

It has been pointed out that all the "9" pins are set in the subtracting operation so that in event a cipher appears in any column of the amount subtracted, the dial for that column will be given a nine point revolution. Where therefore, any digit appears in any column of the amount to be subtracted, it becomes necessary to unset the "9" pin for that column. This unsetting or restoring operation is effected as follows.

Referring to Figs. 1, 5 and 8 it will be noted that each of the rock shafts 47, in addition to having an arm and wrist pin connection to some one of the linkages 40, also has an arm and wrist pin connection 91 and 92 to a linkage 93 similar to the linkages 40 but outside of the rock shaft frame. Each of the "9" pin setting and unsetting levers 75, on its rear arm has an upward projecting lug 94 which, when the pin bar on which it is mounted is set forward by its jack 23, is brought under and in alinement with the linkage 93, so that if any digit key is thereafter operated, the lower reach of linkage 93 is thrown down against the lever 75, so set forward, and rocks that lever to lift or unset the "9" pin on that bar. Each lever 75 has also a lower lug 95 which, by striking the top of its bar 36 limits the restoring movement of the lever 75. The action of the rock shafts 47 in unsetting a "9" pin is simultaneous with setting by the same shaft of any selected pin for any other digit. When the linkages 40 are set for addition by a shift of the rock shafts 47, the latter are disconnected from the linkage 93.

The amount having been written for either addition or subtraction, the general operator bar 80 is actuated to move forward the rack bars 36, and thus rotate the dials the distances corresponding to settings of the pins 37. For this purpose the general operator is provided on each side with a rack 96. Meshing with each rack 96 is a pinion 97 supported on the machine frame, and meshing with each pinion is a segmental rack 98, both segmental racks 98 being fast to a cross shaft 99. Also fast to shaft 99 is an arm 103 carrying a handle 104 for rocking shaft 99 backwardly or forwardly to throw the general operator one way or the other. Since the pin bars 36 are to be driven both forwardly and backwardly by the general operator bar 80, whereas the dials are to move in one direction only, the pinions 101, which are loose on shaft 250, have a pawl and ratchet connection 101ª with the dials 102.

In addition to the pinion 101 which is connected to each dial wheel 102 for driving the same from the pin bars, there is also fast to each dial wheel, a wheel 105 having ten teeth, having several functions, the principal of which is to give to the dial to which it is attached a tens-carrying movement from the next lower dial. Spring detents 106 engaging wheels 105, hold the dials in true position.

To prevent overthrow of the dials by the racks 100, each wheel 105 is also engaged by a detent 107. The detents 107 are in the form of levers loosely mounted on a cross shaft 108; and each has, to the rear of shaft 108, a tooth 109. Extending over all of the teeth 109, but held normally out of engagement with the latter by means of a spring 113, is a bar or bail 110 supported on arms 111 fast to a shaft 112. Also fast to shaft 112 is an arm 114 which, during the movement of the general operator, is held by the spring 113 against a bar 115 secured to the left hand side of the general operator. Bar 115 is turned up at 116 to serve as a cam for rocking the arm 114, and with it the shaft 112 and bar 110, when the general operator, at the end of its forward movement, brings the upturned part 116 to the lever 114; thus causing the bar 110 to strike the teeth 109 and force the detents 107 between the teeth of the wheels 105, locking the latter against overthrow. Until locked by the bar 110, the detents 107 vibrate freely over the teeth of the wheels 105 as the general operator moves forwardly.

The tens-carrying movement from one dial to the next higher is effected on the return of the general operator as follows. One of the racks 96 on the general operator meshes with a pinion 117 which is loosely mounted on a stud on the machine frame and which also meshes with a pinion 118 having a ball and clutch connection 120 to a shaft 119, to drive the latter only on the return movement of the general operator. Fast to shaft 119 are disks 121, one for each dial, and each having a tooth 122 to mesh with one of a number of mutilated gears 123 loose on a countershaft 124. Each gear 123 has every third tooth missing so that unless the gear is properly set, it cannot be reached and moved by the toothed disk 121 opposed thereto. The return movement of the general operator effects one complete revolution of shaft 119, and consequently of all the disks 121. If therefore any gear 123 is set for engagement with its actuating tooth 122 on the opposing disk, the gear is given a partial rotation, which will cause one of three teeth on a disk 126, attached to the gear, to engage and advance one step, the opposing wheel 105 of one of the dials, thus causing that dial to register an increase of "one" which is a carry over of "ten" from the next lower dial.

Until "ten" is to be carried over from any dial the gear 123 for that dial is in Fig. 1 position and cannot be moved by its disk 121. Each dial, however, has one tooth 127 on its periphery, which after a nine point movement of the dial by its pin bar, engages and gives one-ninth of a revolution to the opposing gear 123, thus bringing a tooth of the latter into position to be engaged, on return of the general operator, by the tooth 122 on the opposing disk 121, which latter as above stated, gives the gear 123 a further movement sufficient to register an increase "one" on the next higher dial. The disks 121 are cut away in front of the teeth 122. Undesired movement of gears 123, which have not been set, or which having been set, have been moved the requisite distance on return movement of the carriage, is prevented when the uncut portions of the peripheries of the disks 121 enter the spaces where the teeth are missing on the gears. Tens-carrying movements may be given to several dials during the same return movement of the general operator, and in order that the tens-carrying may be progressive from lower to higher denominations, the teeth 122 on the disks 121 are arranged spirally around the shaft 119, whereby they come into action successively instead of simultaneously.

When the general operator starts its return movement, the bar 110, and with it the detent levers 107, which have locked the dials against overthrow, are released to permit of the tens-carrying operation just described. It is however, desirable to assure the dials against overthrow also in the tens-carrying operation, and for this purpose the detent levers 107 have arms 130 terminating in cam surfaces 131 for engagement with segments 132, fast to shaft 119, and arranged spirally around the shaft, so that after any tooth 122 on a disk has completed a tens-carrying movement of a dial, the proper segment strikes the cam surface 131 of the detent levers with which it coöperates, thereby rocking that lever to throw it into locking engagement with the wheel 105 of that dial, and temporarily holding it in such locking engagement. The forward and backward movements of the general operator are limited by extensions 133 and 134 of the racks 96 striking stops 135 and 136 on the machine frame.

One of the functions of the general operator is to return to normal position the subtraction bar and the parts controlled by the latter, when the same have previously been set for subtraction by operation of the subtraction key. This is accomplished at or near the end of the forward movement of the operation by means of a lug 137 (see Fig. 9) on the subtraction bar in the path of the operator bar 80. The bar 80 on striking the lug 137, draws the subtraction bar forward against the tension of spring 66 until notch 68 registers with dog 64, whereupon the subtraction key spring 61$^a$ snaps the dog into the notch.

Among its other functions, the general operator on its return stroke, restores all of the set pins 37 to their normal raised positions, so that they will be ready to accumulate a subsequent computation. For this purpose, there is provided on the general operator, a pawl 138 which is pivoted so as to swing idly past an arm 139 on a rock shaft 140 during the forward motion of the general operator. A spring 141 however, returns this pawl 138 to its normal position, so that on the return stroke of the general operator, the pawl 138 will act as a cam and swing the arm 139 upwardly, thereby rocking the shaft 140 and an arm 142 to engage and raise a pin-restoring plate 143, which will raise all of the set pins 37. The pin-restoring plate 143 is supported for parallel motion by means of two pairs of bell-crank levers 144, connected for parallel motion by one or more links 145.

The pin-restoring plate not only returns the set pins 37 but also engages a downwardly projecting lug (not shown) on the trigger 87, which provides for the extra step movement of the supernumerary bar 86, whereby the trigger 87, if the previous operation was a subtracting one, will be returned to its normal uppermost position corresponding to the removal of the shoulder thereon from the path of the general operator cross bar 80, whereby the movement of the supernumerary bar 86 will no longer be one step in advance of the general operator cross bar 80.

*Denominational computing or counting mechanism.*

As has been heretofore stated, the present invention relates chiefly to certain mechanism which, although capable of use in many fields, may be advantageously combined with the accumulating or totalizing mechanism hereinbefore described, as for instance in making up a payroll, so that the paymaster may know the number of pieces each, of selected denominations, such as ten, five, and one dollar bills, fifty, ten, five and one-cent pieces, which he will need in paying off the items accumulated in the grand total indicated by the dials 102. This mechanism which has been referred to as the "denominational" computing or coin counting mechanism will now be described.

At the front of the machine, to the right of the accumulator or register comprising the dials 102, are seven counters or indicators marked $10, $5, $1, and 50¢, 10¢, 5¢, and 1¢, respectively. Each of these several accumulators is comprised of three dials 150, for units, tens and hundreds, respectively, each carrying numbers 0 to 9 inclusive, which show through a sight aperture in the casing. The units dial of each of these indicators has a drive like that of dial 102 (see Fig. 1), from a rack 100 by means of a pinion 101 to which it has a pawl and ratchet connection 101$^a$; and each of the seven indicators has tens-carrying mechanism, likewise similar to that shown in Fig. 1, which connects the units dial with the tens dial, and the latter with the hundreds dial; so that each of the seven indicators may therefore indicate amounts to 999. The racks 100 for these seven indicators are carried by bars 151, 152, 153, 154, 155, 156 and 157 respectively, which resemble the pin bars 36 in their action, and in certain features of their construction, but which have certain peculiarities presently to be described. These bars are set from the tappet 19 in the same manner that the bars 36 are set from the tappet 18; the bar 151 however, being the only one of these bars which is set singly, the others being set two at a time.

It has been pointed out that in the particular embodiment of the invention shown in the drawings the denominational computing mechanism, comprising the various coin indicators, is designed to accumulate the denominational elements, as represented in coins, of items not greater than $99.99, and that therefore no single item greater than that should be written when the coin indicating device is used. An amount such as this, having but four column positions, calls for the use of but four of the jacks 23 controlled by the tappet 18, and likewise for but four jacks of corresponding column positions, controlled by the tappet 19. Since any number written in the left hand or tens of dollars column must be a digit, and as the ten dollar piece (viz., coin or bill) is the largest piece or measure used in the present illustration of the invention, the number of ten dollar bills called for when that digit is written is naturally the value of the digit written and registered in the tens of dollars column. Consequently the $10 bar 151 may be a bar having nine pins, 158 representing respectively the nine digits, arranged and mounted exactly as in the case of the bars 36, so that, when the bar 36 for that column is moved forwardly by the general operator to register the amount of the digit, the bar 151 may be moved the same distance to register the number of multiple of ten dollar pieces represented by the digit.

In the next column the situation is different, because it is desired to use not only one dollar pieces, but also five dollar pieces where possible. No matter what digit is written in this column, not more than one "five" can go into it, and it may call for one, two, three, or four "one dollar" pieces with or without the "five dollar" pieces. Consequently, the jack 23 controlled by the tappet 19 for that column, should set not only the $5 bar 152 but also the $1 bar 153.

In the following or third column from the left, the digit for which the corresponding pin bar 36 is set, calls for the registration of one, two, three or four dimes, with or without one fifty-cent piece. The jack 23 controlled by tappet 19 for this column should therefore set not only the 50¢ bar 154 but also the 10¢ bar 155.

In the last or "cents" column, any digit pin set upon the corresponding column pin bar 36 calls for one, two, three or four "one cent" pieces with or without one "five-cent" piece. The jack 23 controlled by the tappet 19 for the last column therefore sets both the 5¢ bar 156 and the 1¢ bar 157.

Figure 3:
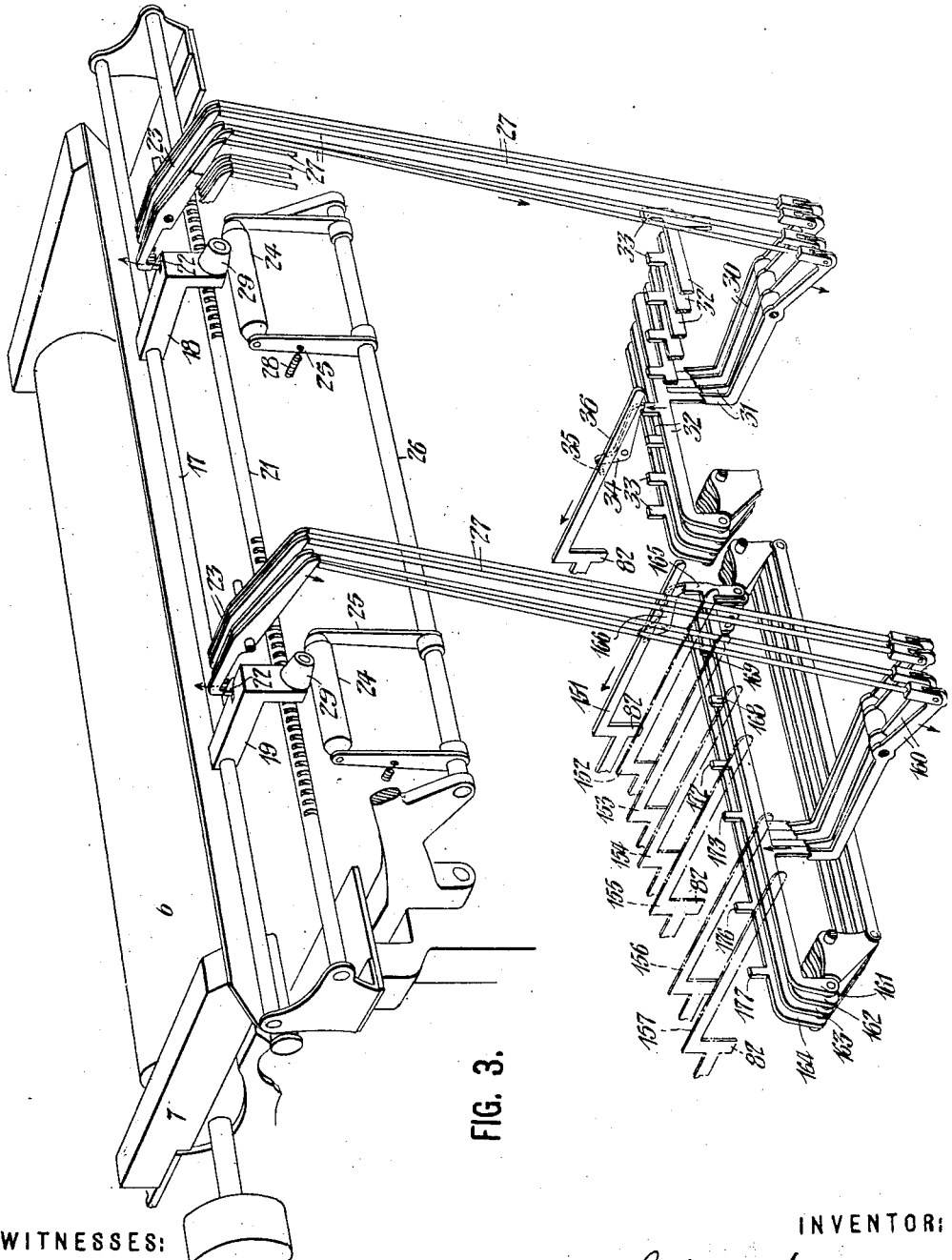
Fig. 3 is a view, in perspective, taken from the rear, showing the carriage and connections to the linkages for setting the computing mechanism.
Figure 10:
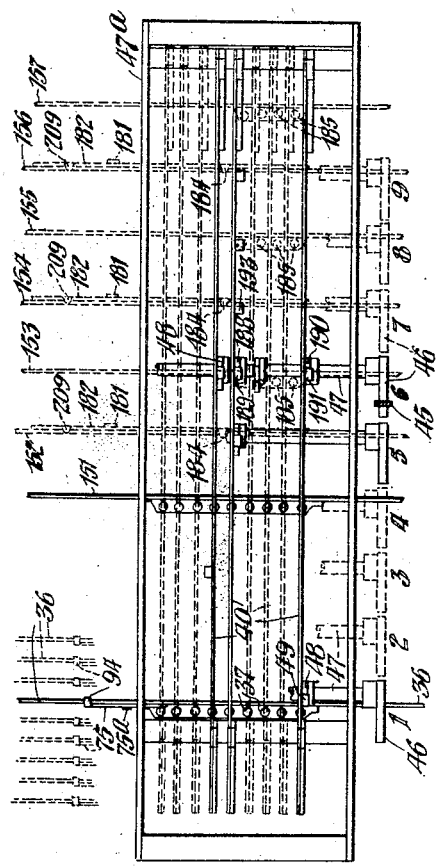
Fig. 10 is a top plan view of the linkages shown in Fig. 5 together with certain of the underlying pin bars and key connections, the parts shown in full lines being those actuated upon depression of the "6" key in the adding operation.
Figure 11:
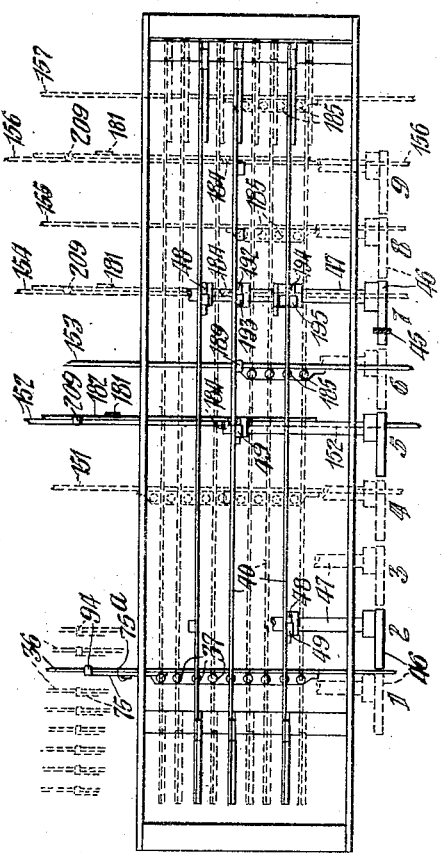

Referring to Figs. 3 and 4, it will be seen that the jacks controlled by tappet 19 connect by means of links 27 with levers 160, each of which operates one of the four linkages 161, 162, 163 and 164 similar to the linkages 32. The linkage 161 has one lug 165 engaging one arm of a bell crank 166, the other arm of which engages a projection 167 on the $10 bar 151, so that when the linkage is actuated by its jacks, it operates to set forward the bar 151 in the same manner that the pin bars 36 are set forward. Linkage 162 has two lugs 168 and 169, the first of which engages a bell crank 170 to set the $5 bar 152, and the second of which engages a bell crank 171 to set the $1 bar 153. Linkage 163 has two lugs 172 and 173 for operating bell cranks 174 and 175 to set the 50¢ bar 154 and the 10¢ bar 155 respectively, and linkage 164 also has two lugs 176 and 177 to operate bell cranks 178 and 179 to set 5¢ bar 156 and 1¢ bar 157 respectively. The linkages 40 (see Figs. 6, 10, 11, 12 and 13) which set the pins 37 are continued over the bars 151 to 157 inclusive, and also serve to set the pins, or their equivalents, on such of these bars as may have been set forward by their jacks, it being understood that the normal or unset position of these bars is such that the pins or equivalents thereof are normally out of alinement with the linkages 40, as in the case of the bars 36.

The $10 bar 151 has nine pins 158 thereon mounted in the same manner as the pins 37, representing multiples of "ten" to be registered, according to the digit written in the tens column when one of the number keys 2 is operated. As to the $5 bar 152, it has been pointed out that not more than one "five-dollar" piece can be registered, whatever the digit written for that column. Therefore the bar 152 needs but one pin, which, for engagement by the general operator cross bar 80 must be in the "1" pin position, but which must be capable of being set from the "5," "6," "7," "8" and "9" keys 2, as each of these numbers contains one "five." On the principle explained, the same is true of the bars 154 and 146, for registering 50¢ and 5¢ pieces, respectively, and since these three bars may therefore be identical in structure, a description of bar 152 will suffice for all three.

The bar 152 (see Fig. 7) has pivoted thereto at 181, a trigger 182 having thereon, in the "1" pin position, a lug 183 normally held out of the path of the operator bar 80. Projecting upwardly from the trigger, in the "5" pin position, is a finger 184. When bar 152 is set forward by its jack, finger 184 is brought under the "5" linkage 40, and when the latter is depressed, in the adding operation, it strikes finger 184, rocking the trigger to throw the lug 183 into the path of the operator bar 80. Finger 184 is turned over at its top, so that the turned-over part, by striking the top of the bar 152, may limit the throw of the trigger. The setting of the trigger 182 from the "5" key 2 is therefore apparent. Its setting from the "6," "7," "8" and "9" keys 2 is by means of cross connections between certain of the linkages 40, presently to be described.

The bars 153, 155 and 157, which are for registering one dollar pieces, dimes and one-cent pieces, being operable in conjunction with the bars 152, 154 and 156 require but four pins 185 in the "1," "2," "3" and "4" pin positions. These pins however, in addition to being operable from the "1," "2," "3" and "4" keys 2 respectively, for registering amounts of one, two, three or four, must also be operable, respectively, from the "6," "7," "8" and "9" keys 2, to register the one, two, three or four needed in addition to one "five" when one of these latter keys 2 is depressed.

The cross connections between the linkages 40, for use in the denominational section of the machine, will now be explained, reference being had to Figs. 5, 8, 10, 11, 12 and 13; the settings shown in the Figs. 10, 11, 12 and 13 being those for writing the amount $67.89. In writing a digit in the tens of dollars or $10 column for addition, no cross connections between the linkages 40 are needed. If, for instance, the "6" key is depressed in that column, the corresponding linkage 40, by reason of its arm and wrist pin connection 48 to the "6" rock shaft 47, will set the "6" pin on both bars 36 and 151; and both will therefore move forward the same distance with the general operator.

When the carriage moves on one letter-space the jacks 23 for the next succeeding column are operated and set forward the proper column pin bar 36 and the bars 152 and 153. If now the "6" key 2 is depressed by the operative (ignoring for the moment the example given above), not only will the "6" linkage 40 be operated to set the "6" pin on the pin bar 36 for registration of "six" on the proper dial 102, but also the "5" linkage 40 should be operated to set lug 183 on bar 152 for the registering of one $5 piece in the $5 accumulator, and the "1" linkage 40 should be operated to set the "1" pin on the $1 bar 153 for registration of $1 on the $1 accumulator. It will be noted that if "6," "5" and "1" linkages are thus operated, then in addition to the "6" pin, the "5" and "1" pins will incidentally be set on the pin bar 36 which has been set forward; but the highest, or "6," pin will be the only effective pin set on that bar, because it is the pin which will be engaged by the operator bar 80. The same holds true as to the bar 151 which will have set thereon a pin representing the digit on the key 2 depressed, although, by reason of cross connections hereinafter explained between the linkages 40, other pins will be set on that bar. In order that under these circumstances, the "6" key 2 may operate not only the "6" linkage, but also the "5" and "1" linkages, it will be seen on reference to Fig. 10, that "6" rock shaft 47 is provided with an arm 188 adapted to engage, when the parts are set for addition, a wrist pin 189 on the "5" linkage 40, and is also provided with a similar arm 190 to engage a wrist pin 191 on the "1" linkage 40. It will be noted that arms 188 and 190 are not bifurcated like the arm 48, but engage their pins from one side only, so that although "6" key will operate "5" and "1" linkages 40, neither "5" nor "1" keys 2 will operate "6" linkage 40.

Now returning to the example $67.89 selected above, for a similar purpose (see Fig. 11) the "7" rock shaft 47 has an arm 192 adapted to engage a wrist pin 193 on the "5" linkage 40, and an arm 194 adapted to engage a wrist pin 195 on the "2" linkage 40, whereby the digit "7" when written in the $1 column, for instance, may be registered as one "five dollar" piece plus two "one dollar" pieces on the $5 and the $1 accumulators, respectively. The principle (again ignoring momentarily the above-mentioned example) is the same when writing the digits "8" and "9"; the "8" rock shaft 47 having an arm 196 (see Fig. 12) adapted to engage wrist pin 197 on the "5" linkage 40, and an arm 198 adapted to engage wrist pin 199 on the "3" linkage 40; and (see Fig. 13) the "9" rock shaft 47 having an arm 200 adapted to engage a wrist pin 201 on the "5" linkage, and an arm 202 adapted to engage wrist pin 203 on the "4" linkage 40. Returning now to the example $67.89, of which the registering of "6" and "7" has been explained, the typewriter carriage, when in the dimes column, sets forward the rack bars 154 and 155, with the result that the actuation of the "8" key sets the trigger 182 on the rack 154 to represent one fifty-cent piece, and at the same time the said "8" key sets the one of the pins 185 which represents three dimes on the rack bar 155. Analogously at the next or cents column, the typewriter carriage sets forward the rack bars 156 and 157, so that the actuation of the "9" key sets the trigger 182 on the rack bar 156 and the pin representing four cents on the rack bar 157.

When the "5" key 2 is operated, as heretofore explained, no cross connections between linkages 40 are required, since the trigger 182 sets the lug 183 for registration of "one" in the $5, 50¢, or 5¢ accumulators, according to the column in which "5" is written. When any key 2 for a digit lower than "five", is operated, no cross connections between linkages 40 are needed. Each linkage 40 sets its respective pin 37 on the pin bar 36, and also the corresponding pin 185 on the bar 153, 155 and 157.

When the general operator is drawn forward to complete a computation after the settings have been made, it drives the bars 151 to 157 inclusive, to accumulate or add in their respective registers or counters according to the settings. The tens-carrying operation is effected in each of the seven denominational accumulators or counters on the return of the general operator, in the same manner as in the ordinary addition of amounts in the adding and subtracting accumulator having the dials 102. The shaft 119 which carries the one-toothed carry-over drive disks 121, already described, also carries two of these disks for each of the seven denominational counters. Loosely mounted on a counter-shaft 205, which is in effect a continuation of shaft 124, are two of the mutilated carry-over gears 123 for each of the seven accumulators. These gears are set by turning them one step, as before described, each by a single tooth on the dials 150, when the latter, on the forward stroke of the operator, move beyond the "9" exhibiting position; and each gear 123, when so set, is further turned, on the general operator return movement, by the disk 121 which meshes with it, and partially rotates a three-toothed disk 125 fast thereto, so that the advanced tooth of the latter will engage and give a one-step movement to a wheel 105 fast to the dial of the denomination next above that of the dial by which such gear 123 was given its initial setting.

The dials 150, like the dials 102, register by movement in one direction only, and so have a pawl-and-ratchet connection 101ª to the gears 101, which are turned, on the forward movement of the operator, by racks 100 on the seven register bars 151 to 157 inclusive. Likewise the disks 121 of these seven registers only rotate on the return movement of the operator, because they are fast on the shaft 119, which latter is driven by the ball and clutch connection, heretofore mentioned.

Detent levers 107, one for each wheel 105, all controlled by the bar 110, by engagement with the wheels 105 of the seven registers, in the manner already described, prevent overthrow of the dials 150 on the forward movement of the operator, and the same levers are controlled by segments 132 on shaft 119, one for each lever, to prevent overthrow of the dials during the tens-carrying operation when the operator returns, as likewise already described. All of the wheels 105 of the seven denominational registers are held in true position by spring detents 106.

The seven denomination registers are all alike, so far as their dials are concerned, and differ from the adding register or accumulator which has the dials 102, mainly in that in the latter each dial 102 is adapted to be separately driven from a pin bar 36, whereas in the denominational registers only the right-hand dial 150 of each register is driven from a bar; all movements of the other dials 150 in each register being simply tens-carrying movements, this being so, because never more than nine units of coins or money are added at once.

When the general operator bar 80 returns, it strikes shoulders 82 on each of the bars 151 to 157 and carries these bars back to normal position where they are held by spring fingers 41 (see Fig. 7) against the plate 44, which also has grooves at 44ª, to serve as guides for the bars. On the return movement of the operator all pins 158 and triggers 182 on the bars 151 to 157 are unset and returned to normal position by plates 143, similar to and which may be integral with the plate 143 under the pin bars 36, each lifted by an arm 142 fast to shaft 140, which is rocked by the trip 138. Bell cranks 144 and link 145 already mentioned, maintain the plates horizontal. A spring detent 206 (see Fig. 7) attached to each of the bars 152, 154 and 156, by engagement with a notch 207 in the trigger 182 on that bar, holds the trigger in place when it is depressed, and, by engagement with a second notch 208 in the trigger, holds the latter in place when elevated. A bent finger 209 on the trigger, by striking the top of the bar determines the upward throw of the trigger.

It will be noted as one of the advantages of the present invention that it provides means whereby a pay roll can be written out on the typewriter, and the pay items thereof be accumulated or added without interfering with the writing out of the names, while at the same time the denominational or coin-registers of the machine will indicate in what form the money for the pay roll needs to be drawn from the bank. The pay roll may be written out either on the envelopes, or on a pay sheet, or (by means of carbon paper) on both simultaneously. The present invention therefore furnishes a check on the work of the pay roll clerk, and at the same time enables him to locate his own errors rapidly, because if an error has been made in filling the pay envelops, there will be either a shortage or a suplus of some one of the coins or bills. The operative may prove the accuracy of transcribing the total by subtracting it out of the register in the usual way, and then the coin registers may be brought to zero, after having made a memorandum of the numbers shown thereon.

It has been stated that in the machine as shown in the drawings, the denominational registers are not designed to be operated when subtraction is being performed. They are therefore rendered inoperative by the following means. Fast to the shaft 56ª, which is rocked to shift the linkages 40 from adding to subtracting position when the subtraction key is pressed, are two arms 210 and 211 from which depend links 212 and 213, on the lower ends of which a bar 214 is carried. Each of the bars 151 to 157 inclusive, is held at its shoulder 82 to the bar 214 by a hook 215, so that when shaft 56ª is rocked to effect the shift for subtraction, the bars 151 to 157 are all swung upwardly from Fig. 7 to Fig. 8 position, a distance sufficient to take the projections 167 out of reach of the bell cranks 170, etc., by which they are set from the jacks 23. The jacks 23 therefore become ineffective to set the denominational bars when the machine is set for subtraction. When the general operator, toward the end of its forward stroke, returns the subtraction bar to normal position, and thus, through the arm 67, rocks shaft 56ª to shift the linkages 40 again to adding position, it again depresses the bar 214 and, by reason of the hooks 215, also the bars 151 to 157, so that the denominational or coin counting mechanism is again effective.

In case of error, any settings of the pins on the bars 36 and bars 151 to 157 inclusive, may be erased at will, before the general operator is actuated, by means of an "error" key 220 (see Fig. 15). This key is held in normal position by a spring 221, and is returned to normal position by this spring after each depression. It carries an arm 222 to a pin 222ᵃ at the end of which is attached a spring 223, the other end of which is attached to a pin 224 on a lever 225 pivoted at 226, which when rocked, engages and lifts the plates 143 to erase all pin settings. Pressure on the key 220 has no effect on the lever 225 until the pin 222ᵃ strikes a lever 228, pivoted at 229 and held in, and returned to normal position by a coil spring 230. A roller 231 at the upper end of the lever 228 holds lever 225 against the tension of spring 223 when key 220 is depressed, until key shaft 227 strikes and rocks lever 228, removing the roller 231 from the lever 225. The accumulated force of spring 223 thereupon snaps lever 225 to lift the plates 143 and unset the pins. Within coil spring 223 is loosely held a pin 232 which, when spring 221 returns the key 220 to normal position, strikes pin 224 on lever 225 and returns the latter to normal position, thus permitting spring 230 to throw roller 231 again under the end of lever 225.

It has been stated that all the dials may be returned to zero position at will. For this purpose there is a zero key 233 mounted on a shaft 234 embraced by a coil spring 235 which holds it in normal position after each operation. The shaft 234, when the key is pressed, strikes a lever 236 which in turn strikes and rocks a trigger 237 pivoted at 238 on a zero bar 239, throwing the rear end 240 of the trigger 237 into the path of the general operator bar 80. A stop 241 on the trigger 237 on striking the general operator bar 80 limits the throw of the trigger. If, when the trigger is thus set the bar 80 moves forwardly, it carries with it the zero bar 239. The zero bar carries a rack 242 meshing with a pinion 243, connected by a ball clutch 244 with the dial shaft 250, so as to pick up and revolve the shaft when moved forwardly, without turning it, however, when moved rearwardly. A disk 245 fast to shaft 250 has a notch 246 engaged by a spring detent 247 (see Fig. 16) to hold the shaft stationary while the dials turn thereon in the register- ing operation. Ball clutches 248 connecting each dial to the shaft 250 permit the dials to be turned freely on the shaft 250 when rotated by the pinions 101 on the forward stroke of the general operator. On the return stroke of the operator, the dials are held by the detents 106 against movement, while the pinions 101, to which they have pawl-and-ratchet connections, rotate backwardly with the racks 100; the shaft 250 being stationary during both the forward and rearward movement of the general operator. When shaft 250 is turned on the forward movement of the zero bar, it picks up and carries with it, by means of clutches 248, all of the dials 150. The forward throw of the rack 242 and the position of the pockets 251 for the balls of the ball clutches 248 are such as to bring the hundreds and tens column dials in each of the seven registers or coin-counters to position when they indicate the number "9". The pockets 252 for the clutches 248 of the units dial of each coin-register, however, are so set that the units dials are picked up by the shaft 250 one-step in advance of the other dials, and are therefore brought to zero position on this movement of the zero bar. Each coin-register therefore reads "990" at the time the general operator starts its return movement, with the tens-carrying gears 123 set to effect a carry-over operation as the general operator returns, so that at the end of the return movement of the latter, the dials 150 register "000". The zero bar is returned by the general operator when the latter reaches the shoulder 82 thereon; but clutch 244 does not pick up the shaft 250 on this movement. The same zero bar 239 may, by making the shaft 250 integral with the shaft which carries the dials 102, in the same manner, return all of the latter to read "999999990" so that after the return movement of the general operator all dials 102 and 105 will read "0".

The invention has been described in connection with a typewriter, and in connection with a computing mechanism of a particular character. It is obvious, however, that many features of it may be presented in many forms and advantageously used for many purposes. It is not limited in scope to the computation of measures in the United States or other decimal currency systems, or to currency measures at all. Neither is it limited in scope to a form in which only amounts of four columns may be computed, nor to use only in addition. With its principle properly in mind, the invention is adaptable to a great variety of uses in many fields.

Variations may be resorted to within the scope of the invention, and portions of the improvements may be used without others.

Having thus described my invention, I claim:

1. In a computing machine, the combination with a totalizer for adding numbers, as expressed by their digits, and indicating their sum, of a plurality of element counters for separately adding numbers of elements of different selected denominations from which amounts represented by said first-mentioned numbers may be made up, settable actuating devices for said totalizer, a settable actuating device for each of said counters, key-controlled setting mechanism, common to all said actuating devices but normally ineffective to set the same, means for selectively and simultaneously bringing an actuating device of said totalizer and an actuating device or one of said counters into effective relation with respect to said setting mechanism, so that both may be simultaneously set at the operation of a single key, and means for causing said actuating devices, when set, to operate said totalizer and said element counter amounts proportional to their respective settings.

2. In a computing machine, the combination with a totalizer for adding numbers, as expressed by their digits, and indicating their sum, of a plurality of element counters for separately adding numbers of elements of different selected denominations from which amounts represented by said first-mentioned numbers may be made up, settable actuating devices for said totalizer, a settable actuating device for each of said counters, key-controlled setting mechanism, common to all said actuating devices but normally ineffective to set the same, means for selectively and simultaneously bringing an actuating device of said totalizer and actuating devices of a plurality of said counters into effective relation with respect to said setting mechanism, so that they may be simultaneously set at the operation of a single key, and means for causing said actuating devices, when set, to operate said totalizer and element counters amounts proportional to their respective settings.

3. In a computing machine, the combination with a totalizer for adding numbers, as expressed by their digits, and indicating their sum, of a plurality of element counters for separately adding numbers of elements of different selected denominations from which amounts represented by said first-mentioned numbers may be made up, settable actuating devices for said totalizer, a settable actuating device for each of said counters, means for causing said actuating devices, when set, to operate their respective totalizer and element counters amounts proportional to their respective settings, key-controlled setting mechanism, common to all of said actuating devices but normally ineffective to set the same, and step-by-step mechanism for selectively and simultaneously bringing an actuating device of said totalizer and one or more actuating devices of said counters into effective relation with said setting mechanism, so that they may all be set at the operation of a single key; the actuating devices of said counters being so grouped with respect to the actuating devices of said totalizer and with respect to said step-by-step mechanism that a totalizer actuating device of any denominational order will always be rendered effective simultaneously with one or more counter actuating devices of counters corresponding to the selected elements of the largest denomination from which an amount corresponding to the part of a number represented by any digit of the same denominational order as that of the selected totalizer actuating device can be made up.

4. In a computing machine, the combination with a single set of differentiated number keys and register mechanism settable by said keys to represent a number by its digits, of means also settable by the same operation of said keys to represent the same number in selected elements of varying denominations, other than the denominations represented by said digits.

5. In a computing machine, the combination with a single set of differentiated number keys, of two sets of registering mechanism simultaneously settable in common by said keys to represent the same number in different denominational elements.

6. In a combined typewriting and computing machine, the combination with printing mechanism comprising a single set of type-bars carrying differentiated number types, effective to print at a common printing point, and a platen movable with respect thereto in the printing of numbers digit by digit in a selected printing zone, of a plurality of element counters for separately adding numbers of elements of different selected denominations from which amounts represented by said printed numbers may be made up, a settable actuating device for each of said counters, means for causing said actuating devices to operate said counters when set, setting mechanism common to all said actuating devices, but normally ineffective to set the same, a single set of differentiated numeral keys for operating said type-bars, said keys also constituting means for operating said setting mechanism, and means for positioning the parts of said printing mechanism to print a digit of a number in its denominational order in said printing zone, said means being at the same time effective to selectively establish cooperative relations between said setting mechanism and the actuating devices of a plurality of said counters representing elements of the largest denomination from which the part of an amount represented by the printed digit can be made up, said setting means comprising means effective at the operation of a key to print a digit to selectively set the actuating devices to represent said digit in terms of the denominations represented by their respective element counters.

7. In a combined typewriting and computing machine, the combination with a single set of differentiated numeral keys, of printing mechanism controlled thereby to represent a number in denominational elements of one kind, and register mechanism settable by said keys during a printing operation to represent said number in denominational elements of another kind.

8. In a combined typewriting and computing machine, the combination with a single set of differentiated numeral keys and means controlled thereby for printing a number digit by digit, of register mechanism settable by said keys at the printing of each digit, to represent the part of said number, for which said digit stands, in elements of varying denominations other than the denomination represented by said digit.

9. In a computing machine, a plurality of independent indicators, each representing a denomination or measure, actuating connections for each indicator, key-controlled settable devices by which an amount may be expressed on said connections, and means forming part of said devices for setting the several actuating connections, so that the same when moved may distribute the amount to the several indicators in terms of multiples of said denominations or measures.

10. In a computing machine, a plurality of independent indicators, each representing a denomination or measure, actuators for each of said indicators, said actuators having settable devices to control the extent of movement of the actuators, means for moving said actuators when set, and key-controlled setting mechanism by which said settable devices may be set to represent the digits of a number, said setting mechanism comprising means for selectively setting the device for one actuator for a movement thereof representing one part of the amount represented by a digit, and for setting the device for another of said actuators for a movement thereof representing another part of the amount represented by said digit.

11. In a computing machine, a plurality of independent indicators, each representing a denomination or measure, actuators for each of said indicators, said actuators having settable devices to control the extent of movement of the actuators, means for moving said actuators when set, key-controlled setting mechanism by which said settable devices may be set to represent the digits of a number, said setting mechanism comprising means for selectively setting the device for one actuator for a movement thereof representing one part of the amount represented by a digit, and for setting the device for another of said actuators for a movement thereof representing another part of the amount represented by said digit, means for unsetting the devices after each indication, and means for accumulating on the indicators amounts successively registered thereon.

12. In a computing machine, a plurality of independent indicators, each representing a denomination or measure, actuators for each of said indicators, said actuators having settable devices to control the extent of movement of the actuators, means for moving said actuators when set, and key-controlled setting mechanism by which said settable devices may be set to represent the digits of a number, said setting mechanism comprising means for selectively setting the device for one actuator for a movement thereof corresponding to a number of units of one of said measures representative of one part of the amount represented by a digit, and for setting the device for another of said actuators for a movement thereof corresponding to a number of units of another of said measures representative of the remaining part of the amount represented by said digit.

13. In a computing machine, a plurality of independent indicators, each representing a denomination or measure, actuators for each of said indicators, said actuators having settable devices to control the extent of movement of the actuators, means for moving said actuators when set, key-controlled setting mechanism by which said settable devices may be set to represent the digits of a number, said setting mechanism comprising means for selectively setting the device for one actuator for a movement thereof corresponding to a number of units of one of said measures representative of one part of the amount represented by a digit, and for setting the device for another of said actuators for a movement thereof corresponding to a number of units of another of said measures representative of the remaining part of the amount represented by said digit, means for unsetting the devices after each indication, and means for accumulating on the indicators amounts successively registered thereon.

14. In a computing machine, a plurality of independent indicators, each representing a denomination or measure, actuators for each of said indicators, said actuators having settable devices to control the extent of movement of the actuators, means for moving said actuators when set, key-controlled setting mechanism through which said settable devices may be set to represent the digits of a number, and keys for operating said setting mechanism, one key for each digit, said setting mechanism comprising means for selectively setting the device for one actuator for a movement thereof representing one part of the amount represented by a digit, and for setting the device for another of said actuators for a movement thereof representing another part of the amount represented by the same digit.

15. In a computing machine, a plurality of independent indicators, each representing a denomination or measure, actuators for each of said indicators, said actuators having settable devices to control the extent of movement of the actuators, connections through which numbers may be expressed by settings of said devices, keys for operating the devices, one key for each digit, means whereby the connections divide the amount into multiples of measures or pieces thereof of different denominations by setting the device for, one actuator for a movement thereof representing a multiple of one of said measures, and for setting the device for another of said actuators for a movement thereof representing a multiple of another of said measures, means for unsetting the devices after each indication; and means for accumulating on the indicators amounts of multiples successively registered thereon.

16. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said devices being normally in unset position, and a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or numeral may be in part registered upon one of said indicator bars in terms of one denomination, and in part upon another of said indicator bars in terms of another denomination.

17. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said devices being normally in unset position, a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or numeral may be in part registered upon one of said indicator bars in terms of one denomination, and in part upon another of said indicator bars in terms of another denomination; and a key for each number for operating said connections.

18. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said detents being normally in unset position, a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or number may be in part registered upon one of said indicator bars in terms of one denomination, and in part upon another of said indicator bars in terms of another denomination, a key for each number for operating said connections, means for unsetting the devices; and means for accumulating on the indicators the components derived from numbers successively expressed upon the controller.

19. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said devices being normally in unset position, a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or number may be in part registered upon one of said indicator bars in terms of one denomination, and in part upon another of said indicator bars in terms of another denomination; and a key for each number for operating said connections; said connections being such that a smaller number may be expressed entirely on one indicator bar, whereas a larger number is expressed on a plurality of said indicator bars.

20. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said devices being normally in unset position, a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or number may be in part registered upon one of said indicator bars in terms of one denomination, and in part upon another of said indicator bars in terms of another denomination; and a key for each number for operating said connections; said connections being such that an indicator bar actuated alone in expressing a smaller number, may be actuated conjointly with an indicator bar for another denomination in expressing a larger number.

21. In a computing machine, a plurality of independent indicators having numerals thereon, each indicator representing a denomination or measure, bars for actuating said indicators, to present one or another of said numerals according to the extent of movement of the bars; said bars having devices arranged therealong by means of which the bars are moved when the devices are set, said devices being normally in unset position, a controller comprising a series of bars arranged crosswise with respect to said indicator bars, each of said last-named bars being adapted to set devices on the indicator bars to determine the movement of the latter according to which of said cross bars are actuated; said controller also comprising connections whereby a plurality of said cross bars may be actuated in expressing a single digit or number, so that the value of said digit or numeral may be in part registered upon one of said indicator bars in terms of one denomination, and in part upon another of said indicator bars in terms of another denomination; and a key for each number for operating said connections; said cross bars being interconnected so that a cross bar operated alone by a key of smaller number may be actuated conjointly with another cross bar from a key representing a larger number.

22. In a computing machine, a plurality of indicators for registering units of different denominations, a bar for actuating each indicator; and means for effecting a conjoint setting of said bars for a single digit so that one bar when actuated will register part of the value of the digit in terms of one denomination, and another bar another part of the value of said digit in terms of another denomination.

23. In a computing machine, a plurality of indicators for registering units of different denominations, and a bar for actuating each indicator, one of said bars having a plurality of devices therealong by any one of which the bar may be moved, all of said devices being normally unset but any one of which may be set to determine the throw of the bar and the corresponding number of units of one denomination to be registered by its indicator; and another of said bars having a single device which, when it is set and the bar thrown, effects registration of an invariable number of units of another denomination.

24. In a computing machine, a plurality of indicators for registering units of different denominations, a bar for actuating each indicator, one of said bars having a plurality of devices therealong by any one of which the bar may be moved, all of said devices being normally unset but any one of which may be set to determine the throw of the bar and the corresponding number of units of one denomination to be registered by its indicator; and another of said bars having a single device which, when it is set and the bar thrown, effects registration of an invariable number of units of another denomination, and means for setting the device of said second bar when a number to be registered is of greater value than the unit value of the denomination represented by that bar.

25. In a computing machine, a plurality of indicators for registering units of different denominations, a bar for actuating each indicator, one of said bars having a plurality of devices therealong by any one of which the bar may be moved, all of said devices being normally unset but any one of which may be set to determine the throw of the bar and the corresponding number of units of one denomination to be registered by its indicator; and another of said bars having a single device which, when it is set and the bar thrown, effects registration of an invariable number of units of another denomination; a numeral key; and means for setting the devices on both of said bars from said key, so that the value of the numeral is thereby distributed to a plurality of indicators.

26. In a computing machine, a plurality of indicators for registering units of different denominations, a bar for actuating each indicator, one of said bars having a plurality of devices therealong by any one of which the bar may be moved, all of said devices being normally unset but any one of which may be set to determine the throw of the bar and the corresponding number of units of one denomination to be registered by its indicator; and another of said bars having a single device which, when it is set and the bar thrown, effects registration of an invariable number of units of another denomination; numeral keys; and means for setting devices on both of said bars from such of said keys as are of numeral value greater than the denominational value represented by the indicator controlled by said second bar, and for setting only devices on said first bar from such of said keys as are of numeral value less than that denominational value.

27. In a combined typewriting and computing machine, a platen carriage, letter-feed mechanism for the carriage, key-controlled means for writing upon the platen digit by digit amounts of a plurality of digits each, register actuating mechanism, means controlled by the movement of said carriage for selectively and successively rendering parts of said actuating mechanism effective at the several column positions, means controlled by said keys for setting parts of said register actuating mechanism in accordance with the value and column position of the digits of said amounts as written, and means also controlled by said keys for setting other parts of said register actuating mechanism to represent like values in terms of a plurality of selected denominations.

28. In a combined typewriting and computing machine, a platen carriage, letter-feed mechanism for the carriage, key-controlled means for writing upon the platen digit by digit amounts of a plurality of digits each, register actuating mechanism, means controlled by the movement of said carriage for selectively and successively rendering parts of said actuating mechanism effective at the several column positions, means controlled by said keys for setting parts of said register actuating mechanism in accordance with the value and column position of the digits of said amounts as written, means also controlled by said keys for setting other parts of said register actuating mechanism to represent like values in terms of a plurality of selected denominations, and means controlled by said register actuating mechanism for adding the representations of like denomination as set up in the various parts thereof.

29. In a combined typewriting and computing machine, a platen carriage, letter-feed mechanism for the carriage, key-controlled means for writing upon the platen digit by digit amounts of a plurality of digits each, register actuating mechanism, means controlled by the movement of said carriage for selectively and successively rendering parts of said actuating mechanism effective at the several column positions, means controlled by said keys for setting parts of said register actuating mechanism in accordance with the value and column position of the digits of said amounts as written, means also controlled by said keys for setting other parts of said register actuating mechanism to represent like values in terms of a plurality of selected denominations, means controlled by parts of said register actuating mechanism for adding the representations of selected denominations in which amounts successively written have been so expressed, and means controlled by other parts of said register actuating mechanism for separately adding the amounts in the terms in which they are written.

30. In a combined typewriting and computing machine, a platen carriage, letter-feed mechanism therefor, key-controlled means for writing upon the platen digit by digit amounts of a plurality of digits each, register actuating mechanism, means controlled by said keys for effecting a double expression of each digit on said register actuating mechanism, one expression being set up in one part of said actuating mechanism in the terms in which the digit is written on the platen, and the other expression being set up in other parts of said actuating mechanism in terms of a plurality of selected measures of different denominations depending upon the column position of the digit in the amount, and two sets of devices controlled by the movement of the carriage for rendering parts of said register actuating mechanism effective for successive column positions, one set governing the registration of the figures in the terms in which they are written, and the other set governing their registration in terms of different denominations.

31. In a combined typewriting and computing machine, a platen carriage, letter-feed mechanism therefor, key-controlled means for writing upon the platen digit by digit amounts of a plurality of digits each, register actuating mechanism, means controlled by said keys for effecting a double expression of each digit on said register actuating mechanism, one expression being set up in one part of said actuating mechanism in the terms in which the digit is written on the platen, and the other expression being set up in other parts of said actuating mechanism in terms of a plurality of selected measures of different denominations depending upon the column position of the figure in the amount, two sets of devices controlled by the movement of the carriage for rendering parts of said register actuating mechanism effective for successive column positions, one set governing the registration of the figures in the terms in which they are written, and the other set governing their registration in terms of different denominations, and means for rendering said last-named set of register setting devices ineffective, whereby amounts may be registered only in the terms in which they are written.

32. In a combined typewriting and computing machine, a platen carriage, letter-feed mechanism therefor, key-controlled means for writing upon the platen digit by digit amounts of several digits each, register actuating mechanism comprising a plurality of column bars adapted to be set in pairs, each bar carrying adjustable devices, means controlled by the movement of the carriage for setting said bars, one pair at a time, according to the position of the carriage, and key-actuated means for setting the devices on the selected bars to express thereon the numeral represented by the key, said numeral being expressed in part on one of said bars in terms of a measure of selected denomination, and on the other of said bars in terms of a measure of another selected denomination.

33. In a combined typewriting and computing machine, a platen carriage, letter-feed mechanism therefor, key-controlled means for writing upon the platen digit by digit amounts of several digits each, register actuating mechanism comprising a plurality of column bars adapted to be set in pairs, each bar carrying adjustable devices, means controlled by the movement of the carriage for setting said bars, one pair at a time, according to the position of the carriage, key-actuated means for setting the devices on the selected bars to express thereon the numeral represented by the key, said numeral being expressed in part on one of said bars in terms of a measure of selected denomination, and on the other of said bars in terms of a measure of another selected denomination, and an accumulator actuated by each bar for adding and indicating the sum of the values successively expressed upon said bars in the successive writing of digits in the same column position.

34. In a combined typewriting and computing machine, a platen carriage, letter-feed mechanism therefor, key-controlled means for writing upon the platen digit by digit amounts of several digits each, register actuating mechanism comprising a plurality of column bars adapted to be set in pairs, each bar carrying adjustable devices, means controlled by the movement of the carriage for setting said bars, one pair at a time, according to the position of the carriage, key-actuated means for setting the devices on the selected bars to express thereon the numeral represented by the key, said numeral being expressed in part on one of said bars in terms of a measure of selected denomination, and on the other of said bars in terms of a measure of another selected denomination, other register actuating mechanism comprising a plurality of column bars each adapted to be set singly, each bar carrying adjustable devices, means controlled by the movement of the carriage for setting the bars of the second mentioned register actuating mechanism according to the position of the carriage; and key-actuated means for setting a device on the selected bar of the second-mentioned register actuating mechanism to express thereon the numeral represented by the key in the terms in which it is written; said key-actuated setting means comprising bars extending crosswise over the column bars of both sets of register actuating mechanism, whereby devices may be set in both sets from the same key.

35. In a combined typewriting and computing machine, a platen carriage, letter-feed mechanism therefor, key-controlled means for writing upon the platen digit by digit amounts of several digits each, register actuating mechanism comprising a plurality of column bars adapted to be set in pairs, each bar carrying adjustable devices, means controlled by the movement of the carriage for setting said bars, one pair at a time, according to the position of the carriage, key-actuated means for setting the devices on the selected bars to express thereon the numeral represented by the key, said numeral being expressed in part on one of said bars in terms of a measure of selected denomination, and on the other of said bars in terms of a measure of another selected denomination; other register actuating mechanism comprising a plurality of column bars each adapted to be set singly, each bar carrying adjustable devices, means controlled by the movement of the carriage for setting the bars of the second-mentioned register actuating mechanism according to the position of the carriage; and key-actuated means for setting a device on the selected bar of the second-mentioned register actuating mechanism to express thereon the numeral represented by the key in the terms in which it is written; said key-actuated setting means comprising bars extending crosswise over the column bars of both sets of register actuating mechanism, whereby devices may be set in both sets from the same key; the devices on certain column bars of the higher of two selected denominations in the first-mentioned register actuating mechanism being positioned to be invariably set for a registration of "one," but having an actuating device which extends into the path of the cross bar controlled by the key whose value is equal to the number of units in the measure of said higher denomination.

36. In a combined typewriting and computing machine, a platen carriage, letter-feed mechanism therefor, key-controlled means for writing upon the platen digit by digit amounts of several digits each, register actuating mechanism comprising a plurality of column bars adapted to be set in pairs, each bar carrying adjustable devices, means controlled by the movement of the carriage for setting said bars, one pair at a time, according to the position of the carriage, key-actuated means for setting the devices on the selected bars to express thereon the numeral represented by the key, said numeral being expressed in part on one of said bars in terms of a measure of selected denomination, and on the other of said bars in terms of a measure of another selected denomination; other register actuating mechanism comprising a plurality of column bars each adapted to be set singly, each bar carrying adjustable devices, means controlled by the movement of the carriage for setting the bars of the second-mentioned register actuating mechanism according to the position of the carriage; key-actuated means for setting a device on the selected bar of the second-mentioned register actuating mechanism to express thereon the numeral represented by the key in the terms in which it is written; said key-actuated setting means comprising bars extending crosswise over the column bars of both sets of register actuating mechanism, whereby devices may be set in both sets from the same key; the devices on certain column bars of the higher of two selected denominations in the first-mentioned register actuating mechanism being positioned to be invariably set for a registration of "one," but having an actuating device which extends into the path of the cross bar controlled by the key whose value is equal to the number of units in the measure of said higher denomination; and connections between said last-named cross bar and the cross bars operated from keys of higher value, such that when the latter are operated "one" may be registered in the accumulator of said higher denomination, and any residue of the key value in the connected accumulator of lower denomination.

37. In a computing machine, in combination, a plurality of computing sections for computing numbers by simultaneously accumulating, in different denominational orders of each section, related number elements of variable magnitude, actuating devices for each of said computing sections, variably settable indexing means for determining the extent of movement of actuating devices of both of said sections when operated, a single set of differentiated keys, each common to elements of different denominational orders of both of said sections, and means controlled by said keys for determining the settings of said indexing means.

38. In a computing machine, the combination with a rack bar, of settable members on said rack bar, a second rack bar, a separately settable member on said second rack bar, a third rack bar, separately settable members thereon, and means for simultaneously and selectively setting settable members on all said bars to represent a single item.

39. In a computing machine, the combination with a rack bar, of a plurality of settable members carried by said rack bar, a second rack bar, a settable member carried by said second rack bar, and means for simultaneously and selectively setting one member on each bar to represent a single item in a single zone.

40. In a computing machine, the combination with a rack bar, of settable members on said rack bar, a second rack bar, a separately settable member on said second rack bar, a third rack bar, separately settable members thereon, means for simultaneously and selectively setting settable members on all said bars to represent a single item, a separate computing wheel driven by each rack bar, and means for driving said rack bars by their settable members to selectively turn all the wheels.

41. In a computing machine, the combination with a rack bar, of a plurality of settable members carried by said rack bar, a second rack bar, a settable member carried by said second rack bar, means for simultaneously and selectively setting one member on each bar to represent a single item in a single zone, a separate computing wheel driven by each rack bar, and means for driving said rack bars by their settable members to selectively turn said wheels.

42. In a computing machine, the combination with a computing device adapted to add or subtract, of a second computing device adapted to add only, a key for making said first device subtract, and means for automatically making said second device ineffective when said first device is subtracting.

43. In a computing machine, the combination with a computing device comprising settable members adapted to add or subtract, of keys for setting said members, connections whereby when said keys are operated they make said device effective for complementary subtraction, a second computing device comprising settable members, and means whereby said second computing device is automatically ineffective when said first device is being set in a subtraction operation.

44. In a computing machine, the combination with actuating devices comprising settable pins, of pin-setting members normally out of alinement with said pins, means for selectively setting said actuating devices to bring their pins into alinement with the pin-setting members, and means for moving said actuating devices clear of said selective-setting means.

45. In a computing machine, the combination with actuating devices comprising settable members, of setting members normally out of alinement with said settable members, bell cranks for moving said actuating devices to bring their settable members into alinement with the setting members, and a bail universal to a plurality of said actuating devices for lifting them clear of their bell cranks.

46. In a computing machine, the combination with a plurality of registers and settable actuating devices therefor, of key-actuated setting bars universal to said devices, and means for selectively making said bars ineffective on the devices of one register by changing the relationship of said bars to another register.

47. In a computing machine, the combination with numeral keys and a traveling carriage, of a plurality of registers and settable actuating devices therefor, key-actuated setting bars universal to said devices, denomination-selecting mechanism for said devices controlled by said carriage and adapted to make said registers simultaneously effective, and means whereby the setting bars are made ineffective on the devices of one register, irrespective of the travel of said carriage, while the denomination selecting mechanism is still effective.

WILLIAM L. GUMPRECHT.

Witnesses:
GEORGE H. VARNEY,
EDWARD P. STORY.